(12) United States Patent
Naick et al.

(10) Patent No.: US 7,908,282 B2
(45) Date of Patent: Mar. 15, 2011

(54) METHOD FOR PROVISION AND USE OF A VISUAL REPRESENTATION OF WEBSITE BROWSING HISTORY

(75) Inventors: Indran Naick, Cedar Park, TX (US); Jeffrey K. Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 11/848,305

(22) Filed: Aug. 31, 2007

(65) Prior Publication Data

US 2009/0063434 A1 Mar. 5, 2009

(51) Int. Cl.
*G06F 17/30* (2006.01)

(52) U.S. Cl. .................. 707/752; 707/758; 707/999.102

(58) Field of Classification Search .................. 707/1–6, 707/9, 10, 100, 101, 200, 751, 752, 758, 707/999.002, 999.003, 999.005, 999.102; 715/200

See application file for complete search history.

(56) References Cited

U.S. PATENT DOCUMENTS

| | | | |
|---|---|---|---|
| 5,768,578 A | 6/1998 | Kirk et al. | |
| 6,310,630 B1 | 10/2001 | Kulkarni et al. | |
| 6,667,751 B1 | 12/2003 | Wynn et al. | |
| 7,013,435 B2 | 3/2006 | Gallo et al. | |
| 7,039,878 B2 * | 5/2006 | Auer et al. | 715/810 |
| 7,225,407 B2 * | 5/2007 | Sommerer et al. | 707/3 |
| 7,404,150 B2 * | 7/2008 | Clark et al. | 715/810 |
| 2002/0147772 A1 | 10/2002 | Glommen et al. | |
| 2003/0041143 A1 | 2/2003 | Ronald et al. | |
| 2004/0003351 A1 | 1/2004 | Sommerer et al. | |
| 2004/0034541 A1 | 2/2004 | Caban | |
| 2006/0101341 A1 | 5/2006 | Kelly et al. | |
| 2006/0224938 A1 | 10/2006 | Fikes et al. | |
| 2006/0224997 A1 | 10/2006 | Wong et al. | |
| 2006/0253594 A1 | 11/2006 | Szabo et al. | |
| 2007/0011616 A1 | 1/2007 | Ording et al. | |
| 2007/0011617 A1 | 1/2007 | Akagawa et al. | |
| 2007/0239702 A1 * | 10/2007 | Vassilvitskii et al. | 707/5 |
| 2007/0276814 A1 * | 11/2007 | Williams | 707/3 |

FOREIGN PATENT DOCUMENTS

| | | |
|---|---|---|
| JP | 9198408 | 7/1997 |
| JP | 11143891 | 5/1999 |
| JP | 2003157282 | 5/2003 |

\* cited by examiner

*Primary Examiner* — Marc R Filipczyk
(74) *Attorney, Agent, or Firm* — Yee & Associates, P.C.; Matthew W. Baca

(57) ABSTRACT

Embodiments of the invention provide site browsing history information that pertains to a specified network site user. One embodiment, directed to a method, comprises the step of acquiring data for a database, wherein the acquired data identifies multiple sites that are accessed by the user in an order, during a specified period of time. The method further comprises accessing at least a portion of the data from the database. From the accessed data, a pictorial representation of a plurality of the websites accessed during the specified time period is generated. The pictorial representation further illustrates the order in which at least some of the websites of the plurality were accessed.

16 Claims, 4 Drawing Sheets

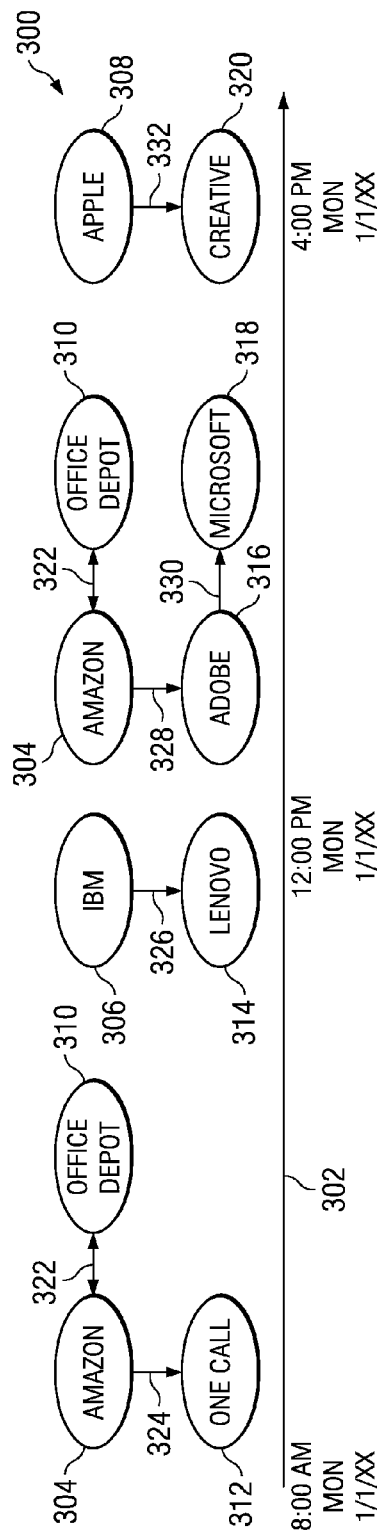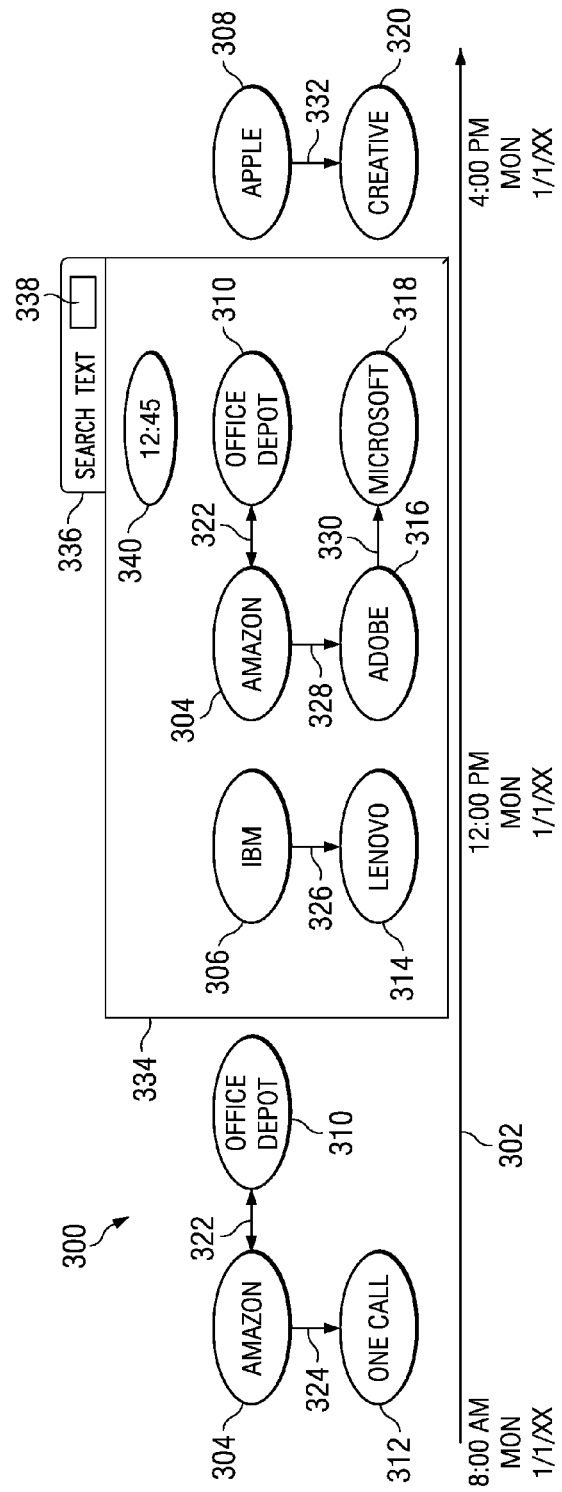
FIG. 3A
FIG. 3B

METHOD FOR PROVISION AND USE OF A VISUAL REPRESENTATION OF WEBSITE BROWSING HISTORY

BACKGROUND OF THE INVENTION

1. Field of the Invention

The invention disclosed and claimed herein generally pertains to a method for providing information regarding website browsing activity, carried out by a web client or other user. More particularly, the invention pertains to a method of the above type wherein information regarding previous website browsing by a user is presented in the form of a visual display, which primarily comprises pictures or other non-textual symbols. Even more particularly, the invention pertains to a method of the above type wherein alternative techniques are available, for using the visual representation to search for an item of information associated with a previously visited website.

2. Description of the Related Art

Browsing the Internet and visiting websites is an increasingly common and continually growing activity. This activity is undertaken by a vast and diverse spectrum of users, for correspondingly diverse reasons. In browsing the Internet, it is common to visit a succession of sites, with one site linking to another site, which in turns links to another. Additionally, in the course of a search the website user may access one or more sites by entering their respective addresses, wherein these sites are not linked in any way to one another or to any previously accessed sites.

Frequently, it can happen that some time after an Internet browsing session has been conducted, such as a few days or a few hours thereafter, the Internet user will seek to return to a particular site that was previously visited. For example, the user may desire to access a remembered item of information, or may seek to carry out an action that can be performed at the particular site. However, in these situations, the user may be unable to recall the address or identity of the particular website, and cannot otherwise remember how to access the website quickly because the web address history file bus was cleared, for example to minimize cookie tracking processes. In this event, the user may be very inconvenienced, or may even be required to expend a significant amount of effort in order to locate the website. Accordingly, it would be beneficial to provide the user with a handy and comparatively simple tool or mechanism to assist him in quickly and efficiently locating the particular website.

While various approaches are currently available for providing a user's website browsing history, these tend to be cumbersome and are often inadequate. Some techniques, for example, furnish website lists that indicate websites visited during a previous period, and are sorted on the basis of the most visited websites. In other prior art techniques, a history navigation tree is used, to show links to interrelated electronic data. Still other techniques disclose web pages that are interconnected to one another by means of web links. These techniques, however, generally do not keep track of browsing events wherein a user accesses a site by independently addressing it, rather than by hyperlinking to the site from a previously accessed site. Accordingly, such techniques may be unable to produce a complete record or history of all websites visited by a user during a browsing session. They also do not provide pictorial or symbolic representations of browsing history, along with a timeline or the like.

SUMMARY OF THE INVENTION

Embodiments of the invention provide site browsing history information that pertains to a specified network site user. One embodiment, directed to a method, comprises the step of acquiring data for a database, wherein the acquired data identifies multiple sites that are accessed by the user in an order during a specified period of time. The method further comprises accessing at least a portion of the data from the database. From the accessed data, a pictorial representation of a plurality of the websites accessed during the specified time period is generated. The pictorial representation further illustrates the order in which at least some of the websites of the plurality were accessed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 3A and 3B are schematic diagrams illustrating an embodiment of the invention.

DETAILED DESCRIPTION OF THE PREFERRED EMBODIMENT

Figure 1:
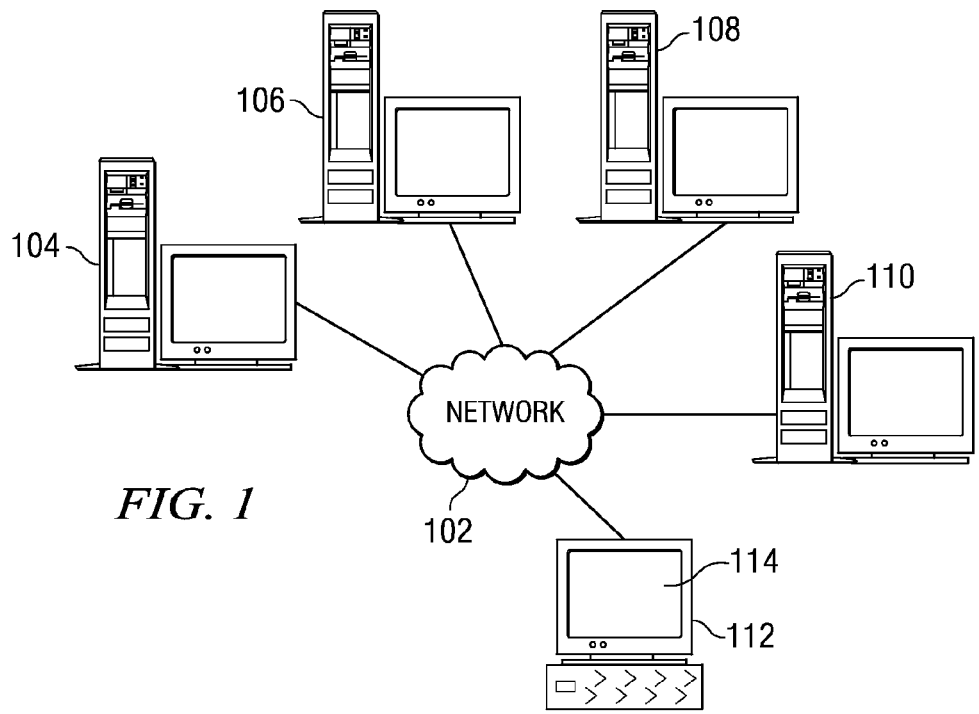
FIG. 1 is a block diagram showing a network such as the Internet, which has sites that can be browsed or accessed by a user implementing an embodiment of the invention.

Referring to FIG. 1, there is shown a network, such as the Internet 102, which has many sites such as websites that are exemplified in FIG. 1 by servers 104-110. Each of these sites can be accessed or visited by a user operating a client computer system or other workstation 112. An embodiment of the invention is usefully implemented by means of computer system 112, as described hereinafter in further detail. FIG. 1 further shows computer 112 provided with a monitor having a display screen 114.

Figure 2:
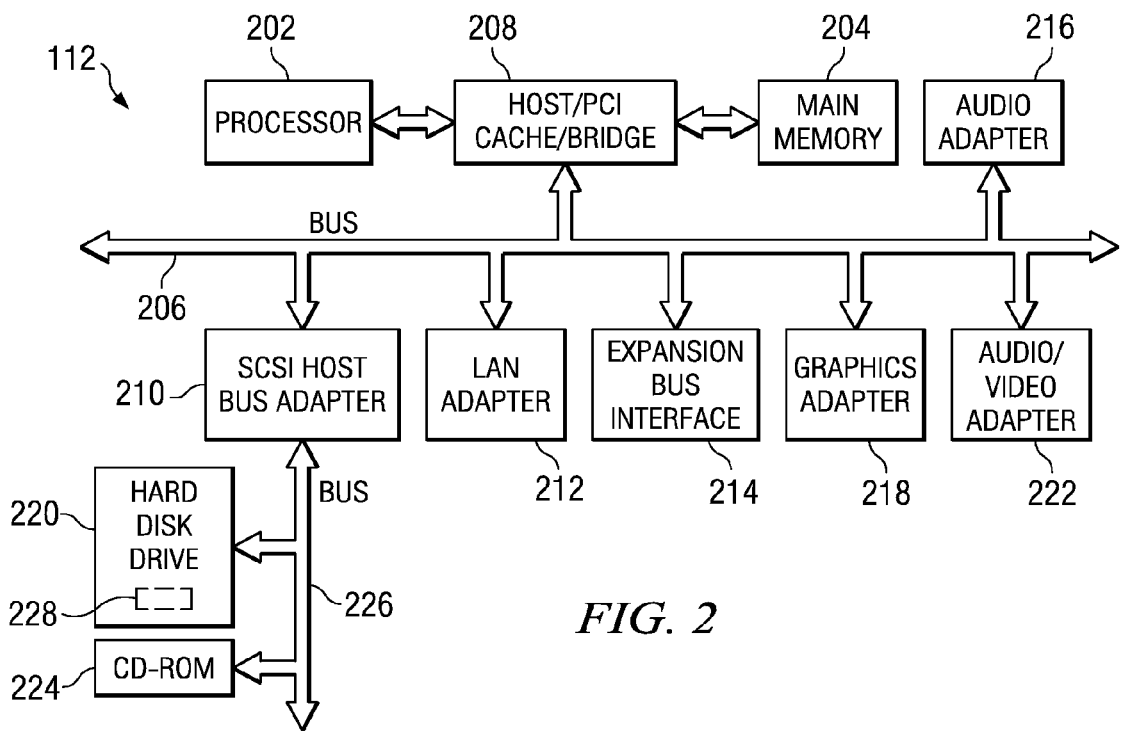
FIG. 2 is a block diagram showing a computer or data processing system that may be used to browse or access sites of the network of FIG. 1, and may be used further to implement embodiments of the invention.

Referring to FIG. 2, there is shown a block diagram depicting a computer or data processing system that may be used as the computer 112, and is configured with a software agent or other component for use in implementing an embodiment of the present invention. Computer system 112 exemplifies a computer, in which code or instructions for implementing the processes of the present invention may be located. Computer system 112 usefully employs a peripheral component interconnect (PCI) local bus architecture, although other bus architectures alternatively are used. FIG. 2 shows a processor 202 and main memory 204 connected to a local bus 206 through a Host/PCI bridge 208. PCI bridge 208 also may include an integrated memory controller and cache memory for processor 202. Devices of system 200 can comprise master and slave devices, and bus controllers as described above may reside in the buses 206 and 226.

Referring further to FIG. 2, there is shown a local area network (LAN) adapter 212, a small computer system interface (SCSI) host bus adapter 210, and an expansion bus interface 214 respectively connected to PCI local bus 206 by direct component connection. Audio adapter 216, a graphics adapter 218, and audio/video adapter 222 are connected to PCI local bus 206 by means of add-in boards inserted into expansion slots. SCSI host bus adapter 210 provides a connection for hard disk drive 220, and also for CD-ROM drive 224 through bus 226.

An operating system runs on processor 202 and is used to coordinate and provide control of various components within data processing system 200 shown in FIG. 2. The operating system may be a commercially available operating system such as Windows XP, which is available from Microsoft Corporation. Instructions for the operating system devices, such as hard disk drive 220, may be loaded into main memory 204 for execution by processor 202.

In accordance with an embodiment of the invention, computer system 112 is provided with a software agent 228 or the like, that resides in a web browser application (not shown) for computer 112. The web browser and agent 228 are usefully contained in disk drive 220 of the computer.

As is well known, a software agent is a component that is generally configured to perform work on behalf of a user. An agent is also well suited to collect information and to carry out automated processes at selectively high levels of functionality. In accordance therewith, agent 228 is adapted to monitor search or browsing activity, whenever computer 112 is operated to browse the Internet and visit successive websites. More specifically, each time computer 112 is used to access or connect to a particular website, agent 228 makes and stores a record thereof. The agent 228 is further operable to store the date and time of access, together with information identifying the particular website that was accessed or connected to. As used herein, "website" refers to a discrete site or location on the network, wherein the site can be uniquely accessed by a specific corresponding address. "Website" can include different webpages or documents, and can also include different sections of the same document.

As is well known by those of skill in the art, if a website has one or more hyperlinks, a user visiting the site can employ one of the hyperlinks to quickly access another site. Alternatively, a user can go from a first site to a second site by entering the address of the second website at his computer. In this situation, there may be no links or other relationship between the two sites whatsoever, other than that they are both connected to the Internet or other network 102. It is to be emphasized that the agent 228 also monitors and stores information indicating which mode or type of connectivity was used to access each website, that is, whether access was established by independently addressing a website, or by hyperlinking thereto.

Referring to FIG. 3A, there is shown a further capability with which agent 228 is provided. More particularly, a user of computer 112 may desire information pertaining to one or more websites that he visited during some previous period of time. In response to specifying the time period, software agent 228 operates the computer to access previously stored data, and to use such data to generate and display a visual representation 300.

Visual representation 300 includes a timeline 302 that corresponds to the specified time period. Representation 300 also displays websites 304-308, which were accessed during the time period, at positions along timeline 302 that indicate their respective times of access. Each of the websites 304-308 is shown in pictorial form, by means of a balloon or other symbol, so that it can be readily distinguished from other displayed sites and features. The order or sequence in which these websites were accessed, relative to one another, is clearly indicated by their respective positions along the timeline. Moreover, the websites 304-308 are spatially separated from one another. Usefully, this is done to indicate that each of these websites was accessed independently of other websites, by entering the address of the website and not by hyperlinking thereto from the preceding site.

Referring further to FIG. 3A, there are shown websites 310 and 312, which the user accessed by hyperlinking thereto from Amazon website 304. The user first went to site 310 via link 322, returned to site 304, and then went to site 312 via link 324. After going to IBM website 306 and hyperlinking to site 314 via link 326, the user again accessed Amazon site 304 and linked to site 310. After returning to site 304, the user linked to site 316 via a link 328. From site 316, the user linked to site 318 via a link 330. Finally, the user visited site 308, and then linked to site 320 via a link 332.

It is seen that FIG. 3A shows each of the hyperlink sites 310-320 by means of balloons, or other symbols, that are substantially smaller in size than those used for sites 304-308. Generally, visual representation 300 depicts the browsing history, or sites searched by computer 112, during the period shown by timeline 302. This history is presented in substantial detail, which is readily discernable by viewing the representation 300. Each of the sites visited during a time period is clearly illustrated. The order in which independently accessed sites 304-308 are visited is likewise clearly illustrated. Some embodiments of the invention may use different colors, in order to further enhance visual distinctions among respective different features. In other embodiments, the time and order in which both independently accessed and hyperlinked sites are visited may be shown by their respective positions along the time line.

Visual representation 300 may be presented as a single view, depending on the length of the time period thereof and the amount of information included therein. Alternatively, the visual representation of browsing history could be presented as a series of views, corresponding to a succession of adjacent time period segments. Visual representation 300 is usefully displayed to a user of computer 112 by means of the display screen 114 of the computer monitor.

In an exemplary utilization of the embodiment of FIG. 3A, a user decides that he would like to revisit a particular website which he had previously accessed, in connection with a search pertaining to high definition (HD) television. He cannot remember the site, or how to access it. However, he does recall that he had linked to the particular site from the website 304, a favorite site of the user. Thus, website 304 serves as an anchor site, or as a landmark. If the user cannot recall the time period when the particular site was accessed, he can readily view the visual representations for successive time periods, until he sees a representation that displays the anchor site 304.

Referring to FIG. 3B, after pulling up the visual representation 300 and detecting the website 304, the user selects one of the instances when site 304 was accessed, as shown by representation 300. The user then directs computer 112 to form or demarcate an area 334 around the selected instance. He also enters the term "HD television" into the search text window 338 of box 336, which may be displayed upon generation of the demarcated search area 334. A search is then carried out, to identify each website included in demarcated area 334 that has information related to the search term. It is anticipated that the software agent 228 can be configured to carry out the respective demarcating, search text entry, and searching tasks. However, embodiments of the invention are not limited thereto.

In a further example using the embodiments of FIGS. 3A and 3B, a user may be able to remember, in regard to a website he would like to revisit, only that he had accessed the site the previous day at 12:45. In FIGS. 3A and 3B, visual representation 300 shows the browsing history for such previous day.

Accordingly, the user enters the remembered time 340, and operates computer 112 to generate the demarcated search area 334 to include sites proximate to such time. A pertinent search term is then entered into text search window 338 of box 336, and sites within the area are searched as described above.

Figure 4:
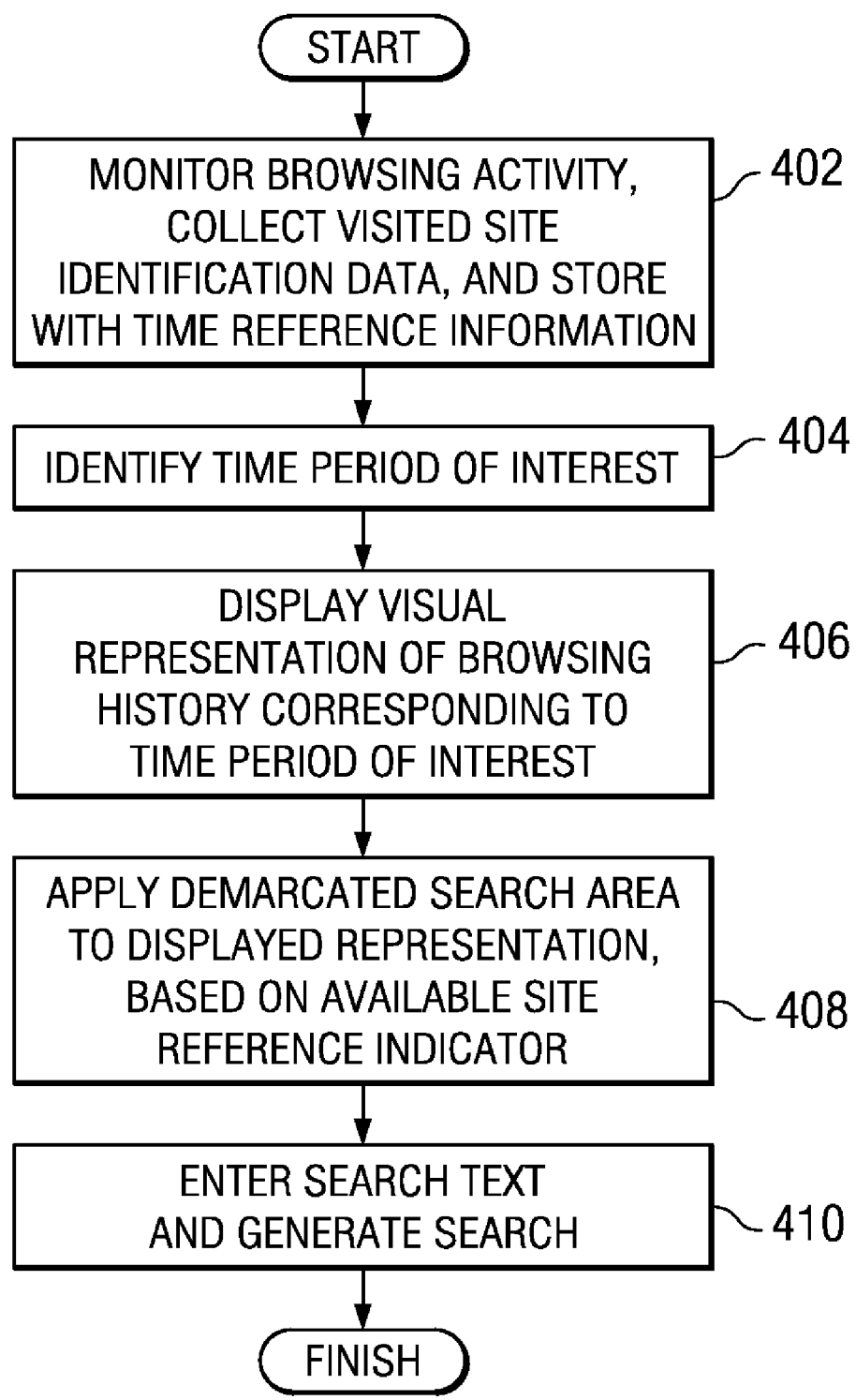
FIG. 4 is a flowchart showing principal steps for the embodiment of FIGS. 3A and 3B.

FIG. 4 shows a flowchart depicting principal steps for embodiments of the invention. At step 402, the browsing activity of a user is monitored, and data pertaining to sites that are visited is collected and stored. The stored data can include information identifying the visited sites, and also the times when the sites were respectively accessed.

At step 404 of FIG. 4, a time period of interest is identified, such as a time period associated with sites that a user may wish to revisit. As described above, a user may recall the time when a particular website was previously visited, and wants to review the browsing history for that time. Alternatively, the user may view representations for successive time periods, until he notices features that identify the visual representation of a particular time period as being of interest.

The visual representation of browsing history, for a time period of interest, is displayed at step 406. At step 408 the user applies the demarcated search area to a portion of the displayed visual representation. If a site reference indicator is available, it may be used as the basis for setting the boundaries of the search area. A site reference indicator, as described above, could be an anchor site or landmark that is known to be associated with a particular site that the user wants to find and revisit. A site reference indicator could also be the approximate time that the particular site was previously visited. In the absence of a site reference indicator, the user could arbitrarily select the region of the displayed visual representation that is to be included in the demarcated search area. After demarcating the search area, the search text is entered at step 410, and a search pertaining to the text is carried out for respective sites included in the search area.

Figure 5:
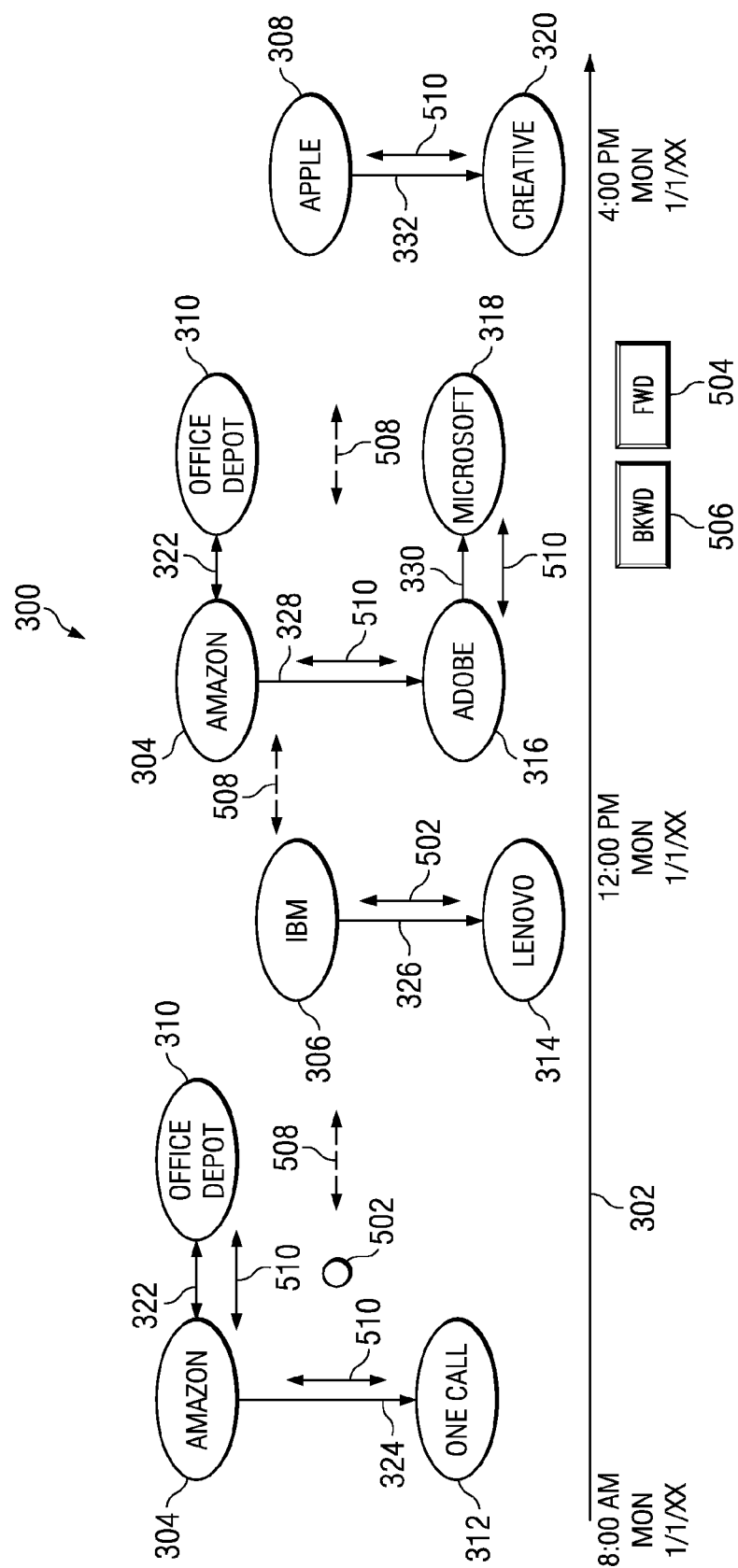
FIG. 5 is a schematic diagram illustrating a further embodiment of the invention.

Referring to FIG. 5, there is shown visual representation 300, formerly presented in FIGS. 3A and 3B, provided for use in connection with a further embodiment of the invention. More specifically, since at least independently accessed websites 304-308 are arranged along timeline 302 in the order in which they were originally visited, they collectively define and indicate the path followed by the user in his original site browsing. Accordingly, visual representation 300 is adapted to enable a user to rediscover a previously visited site, by traversing along this path.

In one implementation, a cursor element 502 is displayed along with visual representation 300. The user can move cursor 502 along the path defined by respective site symbols and links, by using specially provided buttons 504 and 506. Alternatively, the user can move cursor 502 by operating a joystick, mouse or the like. Preferably, cursor 502 can be moved either forward or backward along the path, by operating buttons 504 and 506, respectively. Thus, the cursor can be moved in either direction between the sites 304-308, as indicated by double headed arrows 508. Cursor 502 can also be moved in either direction along each of the links 322-332, extending between sites connected by hyperlinks, as shown by double headed arrows 510.

By providing the configuration shown in FIG. 5, a user can initially select a starting point, such as website 306. He may then traverse one or more paths or routes, until he finds the site that he is looking for. In seeking a previously visited site of interest, he may recall a landmark, that is, a site located proximate to the site of interest that had some distinctive or memorable feature. Looking for this landmark as he traverses respective paths may be very helpful for the user. It is anticipated that such distinctive features in a site browsing history can be made particularly noticeable by displaying browsing history using representations such as visual representation 300.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for providing site browsing history information pertaining to a specified network site user, wherein said method comprises the steps of:
acquiring data for a database, wherein said acquired data identifies multiple websites accessed by said user in an order during a specified period of time;
accessing at least a portion of the data from the database; and
generating from the accessed data a pictorial representation of a plurality of said websites accessed by said user during said specified time period, wherein said pictorial representation is displayed to said user and further illustrates the order in which at least some of the websites of said plurality were accessed, wherein a demarcated search area is applied to said displayed pictorial representation to form an area that includes two or more websites of said plurality of said websites, wherein a search text is applied to the websites collectively contained in the demarcated search area, in order to provide an information item associated with one of said contained websites, and wherein said pictorial representation further comprises a timeline that said plurality of said websites are positioned along to indicate their respective time and order of access.

2. The method of claim 1, wherein:
said pictorial representation comprises a single view that indicates whether a website of said plurality was addressed independently of another accessed website, or was hyperlinked therefrom.

3. The method of claim 1, wherein:
said demarcated search area includes one or more websites that were accessed proximate to a specified time that is included within said specified time period.

4. The method of claim 1, wherein:
said pictorial representation illustrates the order in which each website of said plurality was respectively accessed.

5. The method of claim 1, wherein:
said pictorial representation illustrates the time at which selected websites of said plurality were respectively accessed.

6. The method of claim 5, wherein:
said selected websites comprise each website of said plurality that was addressed independently of another accessed website.

7. The method of claim 1, wherein:
said displayed pictorial illustration indicates one or more paths between websites of said plurality, wherein said paths were respectively traversed by said user when accessing respective websites during said specified time period.

8. The method of claim 7, wherein:
one or more of said paths is selectively traversed, in order to locate and identify a particular website of said plurality of websites.

9. The method of claim 8, wherein:
each of said paths can be traversed in either of two opposing directions.

10. The method of claim 1, wherein:
said visual display is generated by a specified software agent.

11. A computer program product embedded in a computer readable storage medium for providing site browsing history information pertaining to a specified network user, wherein said computer program product comprises:
first instructions for acquiring data for a database wherein said acquired data discloses multiple websites accessed by said user in an order during a specified period of time;
second instructions for accessing at least a portion of the data from the database; and
third instructions for generating from the accessed data a pictorial representation of a plurality of said websites accessed by said user during said specified time period, wherein said pictorial representation is displayed to said user and further illustrates the order in which respective websites of said plurality were accessed, wherein a demarcated search area is applied to said displayed pictorial representation to form an area that includes two or more websites of said plurality of said websites, wherein a search text is applied to the websites collectively contained in the demarcated search area, in order to provide an information item associated with one of said contained websites, and wherein said pictorial representation further comprises a timeline that said plurality of said websites are positioned along to indicate their respective time and order of access.

12. The computer program product of claim 11, wherein:
said pictorial representation comprises a single view that indicates whether a website of said plurality was addressed independently of another accessed website, or was hyperlinked therefrom.

13. The computer program product of claim 11, wherein:
said displayed pictorial illustration indicates one or more paths between websites of said plurality, wherein said paths were respectively traversed by said user when accessing respective websites during said specified time period, and one or more of said paths is selectively traversed, in order to locate and identify a particular website of said plurality of websites.

14. An apparatus for providing site browsing history information pertaining to a specified network site user, wherein said apparatus comprises:
a processor coupled to a memory;
first program instructions for acquiring data for a database, wherein said acquired data identifies multiple websites accessed by said user in an order, during a specified period of time;
second program instructions for accessing at least a portion of the data from the database; and
third program instructions for generating from the accessed data a pictorial representation of a plurality of said websites accessed by said user during said specified time period, wherein said pictorial representation is displayed to said user and further illustrates the order in which at least some of the websites of said plurality were accessed, wherein a demarcated search area is applied to said pictorial representation to form an area that includes two or more websites of said plurality of said websites, wherein a search text is applied to the websites collectively contained in the demarcated search area, in order to provide an information item associated with one of said contained websites, wherein said pictorial representation further comprises a timeline that said plurality of said websites are positioned along to indicate their respective time and order of access, and wherein the first, second and third program instructions are accessed from the memory and executable by the processor.

15. The apparatus of claim 14, wherein:
said pictorial representation comprises a single view that indicates whether a website of said plurality was addressed independently of another accessed website, or was hyperlinked therefrom.

16. The apparatus of claim 14, wherein:
said displayed pictorial illustration indicates one or more paths between websites of said plurality, wherein said paths were respectively traversed by said user when accessing respective websites during said specified time period, and one or more of said paths is selectively traversed, in order to locate and identify a particular website of said plurality of websites.

* * * * *